United States Patent [19]

Fricke

[11] Patent Number: 4,767,506

[45] Date of Patent: Aug. 30, 1988

[54] ELECTROSTATIC TREATMENT OF MILLED CRUDE POTASH SALTS CONTAINING KIESERITE

[75] Inventor: Günter Fricke, Bad Hersfeld, Fed. Rep. of Germany

[73] Assignee: Kali und Salz Aktiengesellschaft, Kassel, Fed. Rep. of Germany

[21] Appl. No.: 81,525

[22] Filed: Aug. 3, 1987

Related U.S. Application Data

[63] Continuation of Ser. No. 792,832, Oct. 25, 1985, abandoned.

[30] Foreign Application Priority Data

Oct. 25, 1984 [DE] Fed. Rep. of Germany ....... 3439042

[51] Int. Cl.$^4$ ................................................ B03B 1/04
[52] U.S. Cl. ..................................... 204/127.4; 209/9; 209/127.1; 209/129
[58] Field of Search ............... 209/127.1, 127.2, 127.4, 209/129, 4, 9, 49

[56] References Cited

U.S. PATENT DOCUMENTS

| | | | |
|---|---|---|---|
| 3,217,876 | 11/1965 | Autenriech | 209/127.1 |
| 3,760,941 | 9/1973 | Singewald | 209/127.2 |
| 3,802,556 | 4/1974 | Frick | 209/127.4 |
| 4,557,827 | 12/1985 | Fricke | 209/127.4 |
| 4,569,432 | 2/1986 | Zentgraf | 209/127.4 |

Primary Examiner—Kenneth M. Schor
Attorney, Agent, or Firm—Michael J. Striker

[57] ABSTRACT

A process is disclosed for the preparation of milled crude potash salts containing kieserite, whereby the crude potash salt is conditioned at first with a chemical conditioning agent and subsequently with an auxiliary conditioning agent, whereupon the crude potash salt is fed to an electrostatic free fall separator.

4 Claims, 1 Drawing Sheet

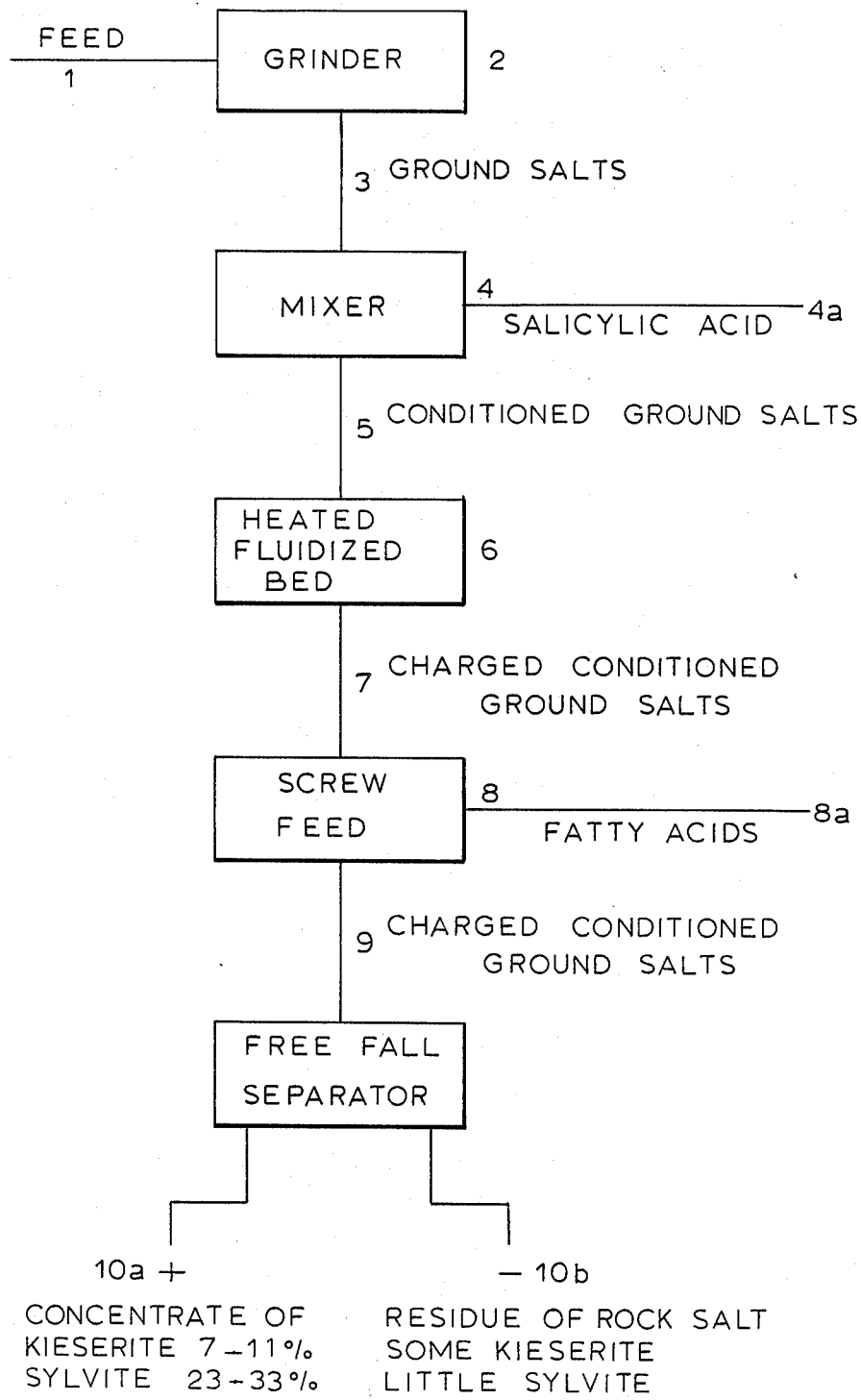

ELECTROSTATIC TREATMENT OF MILLED CRUDE POTASH SALTS CONTAINING KIESERITE

This is a continuation of application Ser. No. 792,832, filed Oct. 25, 1985 and now abandoned.

FIELD OF THE INVENTION

This invention relates to a process for electrostatically preparing a concentrate containing kieserite and sylvite from a milled crude potash salt containing kieserite, sylvite and rock salt.

BACKGROUND OF THE INVENTION

The electrostatic process for separating fine constituent materials in free fall separators has achieved great technical importance, in particular for preparing crude potash salts.

Before the actual separating process, the milled crude potash salt is conditioned with a conditioning agent. The conditioned potash salt is heated and is brought into equilibrium in air having a defined moisture content. Then the crude potash salt is selectively charged and the charge on the particular salt species is dependent on the particular conditioning agent. Subsequently the crude potash salt is separated into its components in an electrostatic free fall separator. Such an electrostatic process for separating crude potash salts into its components is described in *Chemie, Ingenieur, Technik,* 55, 39 (1983).

Processes for electrostatic preparation of crude potash salts containing kieserite are disclosed in DE PS Nos. 17 92 120 and 19 53 534. These patents mention the recovery of a concentrate containing sylvite and kieserite on the positive electrode and a rock salt concentrate on the negative electrode of an electrostatic free fall separator.

In the abovementioned processes, the separation of the sylvite and the kieserite from the rock salt wherein the sylvite and the kieserite are recovered on the positive electrode of the electrostatic free fall separator is enhanced by the use of auxiliary conditioning agents which are applied simultaneously with the conditioning agent to the milled crude potash salt. Compounds which have proved effective as auxiliary conditioning agents include compounds having an acid character contributed by electron-withdrawing atoms or functional groups which are the substituents. Examples of such substituents include —Cl, —Br, —OH, —COOR, —CN or —NO.

Furthermore the abovementioned patents teach that by varying the ratio of the amount of conditioning agent with respect to the amount of the auxiliary conditioning agent, and by varying the air moisture, the ratio $K_2O:M_gO$ can be influenced in the recovered concentrate.

However, in the practical performance of these electrostatic separation processes, it has been demonstrated that these processes can not effectively make a potash fertilizer having a defined MgO content which is between 7 and 11%, while simultaneously having a high $K_2O$ content. In accordance with these known processes the adjustment of a defined mean MgO content in the concentrate is not possible, because the separation of the crude salt components must be performed under such conditions where slight fluctuations of the humidity in the air cause drastic changes in the composition of $K_2O$ and MgO in the concentrate. Therefore the prior art does not disclose how a concentrate of a defined mean MgO content can be mass produced.

OBJECT OF THE INVENTION

It is the object of the invention to provide a process for electrostatic preparation of a milled crude potash salt containing kieserite, sylvite and rock salt, which enables the preparation of a sylvite-kieserite concentrate having a defined MgO content of 7 to 11% along with a simultaneously high $K_2O$ content.

SUMMARY OF THE INVENTION

According to the invention a crude potash salt containing rock salt, kieserite, and sylvite is milled to a fine particle size, preferably about 1 to 2 mm. The milled crude potash salt is then admixed with a chemical conditioning agent in an amount of 30 to 60 g of conditioning agent per ton of crude potash salt. The conditioned crude potash salt is then triboelectrically charged in air having a relative humidity of 5 to 13% and is subsequently mixed with an auxiliary conditioning agent in an amount of 20 to 60 g/ton of crude salt. Then the treated salts are led to a free fall separator where the desired concentrate containing the sylvite and the defined percentage of the kieserite is attracted to the positive electrode said concentrate having the desired 23 to 33% sylvite content and the 7 to 11% MgO content, while the rock salt together with lesser amounts of kieserite and very small amounts of sylvite form a residue which is charged positively and which is attracted to the negative electrode of said separator.

In summary, it has been shown to be advantageous to admix the auxiliary conditioning agent with the crude potash salt in the transport device (e.g. screw feed) with which the crude potash salt is fed to the charge means of the electrostatic free fall separator. In this situation, the addition of the principal conditioning agent is performed in a mixer and the addition of the auxiliary conditioning agent is carried out after the mixing stage and the triboelectric heating but of course before passing the milled crude salts to the free fall separator.

A preferred amount of the conditioning agent to be employed is 40 g/ton of the crude salt.

The preferred temperature for the triboelectric charging treatment is 30° to 80° C.

The conditioning agent is an ortho-hydroxy-aromatic carboxylic acid. Examples of such compounds include salicylic acid and o-cresotic acid.

The auxiliary conditioning agent includes fatty acids having 6 to 14 carbon atoms and mixtures thereof. Examples of such mixtures of fatty acids include the following:

(a) 2% $C_6$ fatty acids,
(b) 60% $C_8$ fatty acids,
(c) 35% $C_{10}$ fatty acids, and
(d) 3% $C_{12}$ fatty acids; as well as
(a') 0.9% $C_6$ fatty acids,
(b') 39% $C_8$ fatty acids,
(c') 33% $C_{10}$ fatty acids,
(d') 24.9% $C_{12}$ fatty acids, and
(e') 2.2% $C_{14}$ fatty acids.

It has been found that the amount of the auxiliary conditioning agent applied to the charged crude potash salts influences the amount of kieserite in the desired concentrate. If the amount of the auxiliary conditioning agent is lowered, the sylvite content of the concentrate (expressed in terms of $K_2O$) is decreased and simultaneously the kieserite content is increased and vice versa. In this manner in the process according to the invention, a concentrate with a defined MgO content between 7 and 11% and a defined K$_2$O content between 23 and 33% is obtained at the foot of the electrostatic free fall separator at the positive electrode. Such a concentrate is highly desirable and its formation is a particular advantage of the process according to the invention.

Furthermore where the process according to the invention is employed, fluctuations in the relative air humidity to levels as low as 5% or even lower or to levels as high as 12.5% or even higher during the separation process have very little effect on the composition of the desired concentrate in terms of sylvite (expressed as K$_2$O) content or in terms of kieserite content A concentrate made in accordance with the process of the invention can be directly further processed into granular potash, whereby the total MgO content of the granular potash is contributed by the concentrate containing sylvite and kieserite according to the invention. In this regard it is noted that the formula weight for kieserite is about 138 and the formula weight for MgO is about 40. Hence the formula weight of MgO is only 29% of that of kieserite yet both salts contain the same equivalents of magnesium. The data set forth hereinafter in the examples include data for kieserite content in both the concentrate and in the residue. To convert these data to data for MgO content, the kieserite content is simply multiplied by 0.29.

The process according to the invention offers for the first time a means for preparing a concentrate with a defined mean MgO content with simultaneously high K$_2$O content under controlled conditions, suitable for mass production, from crude potash salts.

BRIEF DESCRIPTION OF THE DRAWINGS

FIG. 1 is a flow diagram covering a first preferred feature of the invention.

DETAILED DESCRIPTION OF THE DRAWINGS

In FIG. 2 crude salts containing sylvite, kieserite and rock salt are introduced through conduit 1 into a grinder 2 where the salts are milled to a fine particle size, about 1 to 2 mm. The milled crude salts are led from the grinder through conduit 3 to a mixer 4 where an ortho-hydroxy-aromatic carboxylic acid (e.g. salicylic acid) is introduced into the mixer through conduit 4a. About 30 to 60 g of conditioning agent are employed per ton of crude salts. The conditioned salts then leave the mixer through conduit 5 where said salts are then added to a heated fluidized bed and triboelectrically charged at a relative moisture of 5 to 13% and at a temperature of 30° to 80° C.

After the triboelectric charging which places a negative charge on the majority of the kieserite and especially on the sylvite and a positive charge on the rock salt and on a lesser amount of the kieserite, the milled crude salts are directed through conduit 7 to a screw feed 8 where the fatty acid auxiliary conditioning agent is introduced through line 8a. The resulting mixture is then led through conduit 9 to a free fall separator 10 having a positive electrode 10a and a negative electrode 10b. A concentrate containing 7 to 11% kieserite and 23 to 33% sylvite forms at the positive electrode and is recovered while a residue principally containing rock salt collects at the negative electrode.

According to the invention sylvite has been charged highly selectively against rock salt whereas kieserite has been charged with far less selectivity. This particular type of charging has been carried out by first applying the ortho-hydroxy-aromatic carboxylic acid conditioning agent and then applying the fatty acid auxiliary conditioning agent.

The following examples illustrate the present invention as well as the prior art.

EXAMPLE 1

(according to the invention)

A crude potash salt with the following composition:
19.9% sylvite (equivalent to 12.6% K$_2$O in terms of potassium),
20.9% kieserite,
58.8% rock salt, and
0.4% anhydrite
is milled to a grain size of 1.25 mm and is conditioned in a mixer with 40 g of salicylic acid per ton of crude potash salt and is then triboelectrically charged by means of heating. Subsequently the charged crude potash salt is channeled to a screw feed where it is admixed with the auxiliary conditioning agent, that is a mixture of C$_6$ to C$_{14}$ fatty acids as defined hereinabove. The amount of auxiliary agent employed is 40 g/ton of crude milled salts. Then the crude milled salts are channeled to the electrostatic free fall separator. The results of the electrostatic separation are illustrated in the following tables:

| separating conditions | | concentrate | | residue | | yield in concentrate (%) | |
|---|---|---|---|---|---|---|---|
| °C. | % rel hu. | % K$_2$O | % kieser. | % K$_2$O | % kieser. | K$_2$O | kieser. |
| 50.5 | 5 | 30.2 | 27.8 | 1.5 | 16.6 | 92.5 | 51.3 |
| 42 | 7.5 | 29.5 | 29.2 | 1.5 | 15.5 | 92.7 | 55.3 |
| 37 | 10 | 28.9 | 30.1 | 1.6 | 14.7 | 92.6 | 58.1 |

When 40 g/ton of salicylic acid was used as conditioning agent and 20 g/ton of the same fatty acid mixture as used above were employed as auxiliary conditioning agent, the following results were obtained for the electrostatic separation:

| separating conditions | | concentrate | | residue | | yield in concentrate (%) | |
|---|---|---|---|---|---|---|---|
| °C. | % rel hu. | % K$_2$O | % kieser. | % K$_2$O | % kieser. | K$_2$O | kieser. |
| 50.5 | 5 | 24.5 | 32.9 | 1.5 | 9.7 | 93.8 | 75.9 |
| 42 | 7.5 | 24.3 | 34.3 | 1.4 | 8.1 | 94.2 | 80.2 |
| 35 | 12.5 | 23.1 | 35.7 | 1.8 | 5.6 | 93.1 | 86.7 |

When 40 g/ton of salicylic acid was used as conditioning agent and 40 g/ton of the same fatty acid mixture as used above were employed as auxiliary conditioning agent, the folowing results were obtained in the electrostatic separator.

| separating conditions | | concentrate | | residue | | yield in concentrate (%) | |
|---|---|---|---|---|---|---|---|
| °C. | % rel hu. | % K$_2$O | % kieser. | % K$_2$O | % kieser. | K$_2$O | kieser. |
| 56 | 5 | 32.4 | 24.0 | 1.4 | 19.2 | 92.7 | 41.4 |
| 48 | 7.5 | 31.4 | 27.4 | 1.3 | 17.0 | 93.3 | 49.1 |
| 40 | 12.5 | 29.9 | 28.4 | 1.4 | 16.1 | 93.1 | 53.3 |

EXAMPLE 2

(state of the art)

A crude potash salt with the following composition:
19.9% sylvite (equivalent to 12.6% $K_2O$ in terms of potassium)
20.9% kieserite
58.8% rock salt
0.4% anhydrite
is milled to a grain size of 1.25 mm and is conditioned in a mixer with salicylic acid and simultaneously with an auxiliary conditioning agent.

The following combinations of salicylic acid and auxiliary conditioning agents were employed:

| Test No. | Combination of Conditioning Agents |
|---|---|
| 1-3 | 40 g of salicylic acid + 60 g of lactic acid |
| 4 | 60 g of salicylic acid + 20 g of monochloroacetic acid |
| 5-6 | 40 g of salicylic acid + 60 g of lactic acid |
| 7-9 | 40 g of salicylic acid + 50 g of fatty acid |
| 10 | 40 g of salicylic acid + 50 g of fatty acid |
| 11 | 40 g of salicylic acid + 26 g of fatty acid |
| 12 | 40 g of salicylic acid + 13 g of fatty acid |

The combinations of the conditioning agents were employed in the given amounts per ton of crude milled salts. The results are as follows:

| Test No. | separating conditions °C. | % rel hu. | concentrate % $K_2O$ | % kieser. | residue % $K_2O$ | % kieser. | yield in concentrate (%) $K_2O$ | kieser. |
|---|---|---|---|---|---|---|---|---|
| 1 | 44 | 7 | 22.5 | 36.1 | 1.9 | 4.4 | 92.9 | 89.9 |
| 2 | 37 | 10 | 22.2 | 36.7 | 1.8 | 3.1 | 93.3 | 93.0 |
| 3 | 30 | 15 | 22.3 | 36.3 | 1.9 | 3.9 | 92.8 | 91.1 |
| 4 | 37 | 10 | 22.7 | 36.3 | 1.7 | 4.3 | 93.5 | 90.1 |
| 5 | 64 | 4 | 26.2 | 32.6 | 1.9 | 11.7 | 91.7 | 68.8 |
| 6 | 59.5 | 5 | 30.2 | 27.8 | 1.6 | 16.6 | 92.2 | 51.2 |
| 7 | 46 | 7.5 | 36.1 | 8.1 | 1.2 | 27.1 | 93.7 | 12.7 |
| 8 | 41 | 10.0 | 31.5 | 14.0 | 1.3 | 25.0 | 93.3 | 25.0 |
| 9 | 33 | 15.0 | 27.3 | 20.3 | 2.1 | 21.3 | 90.2 | 40.4 |
| 10 | 46 | 7.5 | 36.1 | 8.1 | 1.9 | 27.1 | 93.7 | 12.7 |
| 11 | 46 | 7.5 | 29.2 | 14.7 | 1.3 | 25.1 | 94.0 | 28.5 |
| 12 | 46 | 7.5 | 26.2 | 19.7 | 1.4 | 21.9 | 93.7 | 42.5 |

According to the examples, when the process according to the invention is carried out, the sylvite and kieserite content in the concentrate stay within the desired limits even with some fluctuation in temperature and relative humidity during the electrostatic separation.

In the case of the comparative tests which represent the prior art, Tests 1-4 produce a concentrate whose $K_2O$ content is too low and whose kieserite content is too high. In Tests 7-12, the kieserite content in the concentrate is too low. In Tests 5-6, the conditions are too unstable even though the $K_2O$ and kieserite concentrations are in the desired range. In other words, slight changes in the temperature and relative humidity during the electrostatic separation result in drastic changes in the percentage of sylvite and kieserite in the concentrate.

What is claimed is:

1. A process for the electrostatic separation of a crude potash salt containing kieserite, sylvite and rock salt to produce a concentrate having a magnesium oxide content of 7 to 11% and a potassium oxide content of 23 to 33%, which comprises the steps of:
   (a) milling the crude potash salt to a grain size of 1 to 2 mm;
   (b) admixing the milled crude salt with about 30 to 60 g/ton of an ortho-hydroxy-aromatic carboxylic acid conditioning agent;
   (c) triboelectrically charging the milled crude salt treated in step (b) at a relative humidity of 5 to 13% to charge the kieserite and the sylvite negatively and the rock salt positively;
   (d) treating the milled crude salt triboelectrically charged in step (c) with an auxiliary conditioning agent comprising a $C_6$ to $C_{14}$ fatty acid or a mixture of $C_6$ to $C_{14}$ fatty acids, in an amount of 20 to 60 g/ton of milled crude salt; and
   (e) feeding the milled crude salt treated in step (d) to a free fall separator to form the product concentrate wherein kieserite and sylvite are concentrated on the positive electrode in controlled proportions and rock salt is concentrated on the negative electrode in a controlled proportion.

2. The process for the electrostatic separation of a crude potash salt containing kieserite, sylvite and rock salt as defined in claim 1 wherein the ortho-hydroxy-aromatic carboxylic acid conditioning agent is salicylic acid or o-cresotic acid.

3. The process for electrostatic separation of a crude potash salt containing kieserite, sylvite and rock salt as defined in claim 1 wherein the auxiliary conditioning agent is a mixture of fatty acids consisting of 2% $C_6$ fatty acids, 60% $C_8$ fatty acids, 35% $C_{10}$ fatty acids, and 3% $C_{12}$ fatty acids.

4. The process for the electrostatic separation of a crude potash salt containing kieserite, sylvite and rock salt as defined in claim 1 wherein the auxiliary conditioning agent is a mixture of fatty acids consisting of 0.9% $C_6$ fatty acids, 39% $C_8$ fatty acids, 33% $C_{10}$ fatty acids, 24.9% $C_{12}$ fatty acids, and 2.2% $C_{14}$ fatty acids.

* * * * *